United States Patent
Flach

(10) Patent No.: US 11,429,715 B2
(45) Date of Patent: Aug. 30, 2022

(54) AVIONICS SYSTEM EMBEDDED THREAT DETECTOR

(71) Applicant: Rockwell Collins, Inc., Cedar Rapids, IA (US)

(72) Inventor: Andrew T. Flach, Toddville, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 565 days.

(21) Appl. No.: 16/509,268

(22) Filed: Jul. 11, 2019

(65) Prior Publication Data

US 2021/0334366 A1   Oct. 28, 2021

(51) Int. Cl.
| G06F 21/55 | (2013.01) |
| G06N 20/00 | (2019.01) |
| G06F 9/455 | (2018.01) |
| G06F 11/32 | (2006.01) |
| G06F 21/64 | (2013.01) |

(52) U.S. Cl.
CPC ........ *G06F 21/554* (2013.01); *G06F 9/45558* (2013.01); *G06F 11/327* (2013.01); *G06F 21/64* (2013.01); *G06N 20/00* (2019.01); *G06F 2009/45587* (2013.01)

(58) Field of Classification Search
None
See application file for complete search history.

(56) References Cited

U.S. PATENT DOCUMENTS

| 2016/0261612 A1* | 9/2016 | Mesdaq | H04L 63/1416 |
| 2018/0052997 A1* | 2/2018 | Wray | G06F 21/566 |
| 2018/0075234 A1* | 3/2018 | Boutnaru | G06F 21/554 |
| 2018/0322282 A1* | 11/2018 | Marcourt | G06F 21/55 |

OTHER PUBLICATIONS

Extended Search Report for European Application No. 201852873.8 dated Nov. 23, 2020, 9 pages.

* cited by examiner

*Primary Examiner* — William J. Goodchild
(74) *Attorney, Agent, or Firm* — Suiter Swantz pc llo

(57) ABSTRACT

A method for detecting a threat to an avionics system includes an Embedded Threat Detector (ETD) providing a non-bypassable module which compares run time signatures of each running application with pre-defined database of signatures. Any variation outside of pre-defined bounds implies an existence of malware. The ETD is located in a root Virtual Machine (VM0) and has two modes of operation. A learning mode in a controlled environment generates a database of controlled signatures for each software thread as the software is executed. Conversely, in the run mode during operations, the ETD generates signatures in real time and compares the real time signatures with the controlled signatures. A mismatch exceeding specified limits generates an alert and notifies a user.

15 Claims, 4 Drawing Sheets

AVIONICS SYSTEM EMBEDDED THREAT DETECTOR

BACKGROUND

Current aircraft computing systems may be becoming increasingly dependent on connectivity via a Platform Internet Technology (IT). Some high value aircraft may be targeted with threats which may disable certain systems as well as alter systems to perform an undesirable function. Some threats including a "Zero Day Attack" and "Man-in-the-middle" attack may threaten safety of crewmembers and may be detrimental to the execution of a mission.

Traditional embedded avionics applications may have been immune to external threats since these systems were closed and highly deterministic. Newer systems are becoming more open and connected to networks vulnerable to intrusion. Some systems maintain connectivity with Internet Protocol (IP)-based messaging and maintain the flexibility to view and query web pages providing a path for aviation system exploitation.

These and other attacks may insert malware to cause mission degradation as well as risks to flight safety. Current malware protection (e.g., a firewall) may be designed for enterprise solutions and may require a specific definition or identification of the threat malware before the protection is able to counter the threat. Some traditional intrusion detection mechanisms may also require hardware modifications to monitor for illicit activity. For many airborne applications, where space and weight are at a premium, adding or changing hardware may be undesirable and cost prohibitive.

Therefore, a need exists for a system and related method which may overcome these limitations and provide a novel solution to avionics threat detection and mitigation by providing an embedded threat detector capable of protecting avionics systems against unknown threats.

SUMMARY

In one aspect, embodiments of the inventive concepts disclosed herein are directed to a method for detecting a threat to an avionics system. The method may comprise associating an Embedded Threat Detector (ETD) with an avionics system controller, the avionics system controller onboard an aircraft, the ETD incorporated within a non-bypassable root virtual machine within the avionics system controller, the ETD including a signature deviation tolerance.

In a learning mode, the method may include generating a plurality of controlled signatures in a learning mode, each controlled signature of the plurality of controlled signatures defining at least one controlled thread of an avionics application associated with the avionics system and storing the plurality of controlled signatures within a non-volatile memory (NVM).

In an operational mode, the method may include generating a runtime signature in an operational mode, the runtime signature defining at least one runtime thread of the avionics application associated with the avionics system and comparing at least one runtime signature with at least one controlled signature of the plurality of controlled signatures. The method may further include determining a difference between the at least one runtime signature and at least one controlled signature, comparing the difference with the signature deviation tolerance, and alerting a user if the difference exceeds the signature deviation tolerance.

A further embodiment of the inventive concepts disclosed herein may include a method for avionics system threat detection. In the learning mode, the method may comprise a means for generating a plurality of controlled signatures in a controlled environment and a means for storing the controlled signatures. In addition, the method may include a means for storing a signature deviation tolerance.

In the operational mode, the method may include a means for generating at least one runtime signature in an aircraft operational environment, and a means for comparing at least one runtime signature with at least one stored controlled signature of the plurality of controlled signatures. In addition, the method may include a means for determining a difference between the at least one runtime signature and at least one stored controlled signature of the stored controlled signatures and a means for comparing the difference with the signature deviation tolerance. Further, the method may include a means for alerting a user if the comparing means results in a difference outside the signature deviation tolerance.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
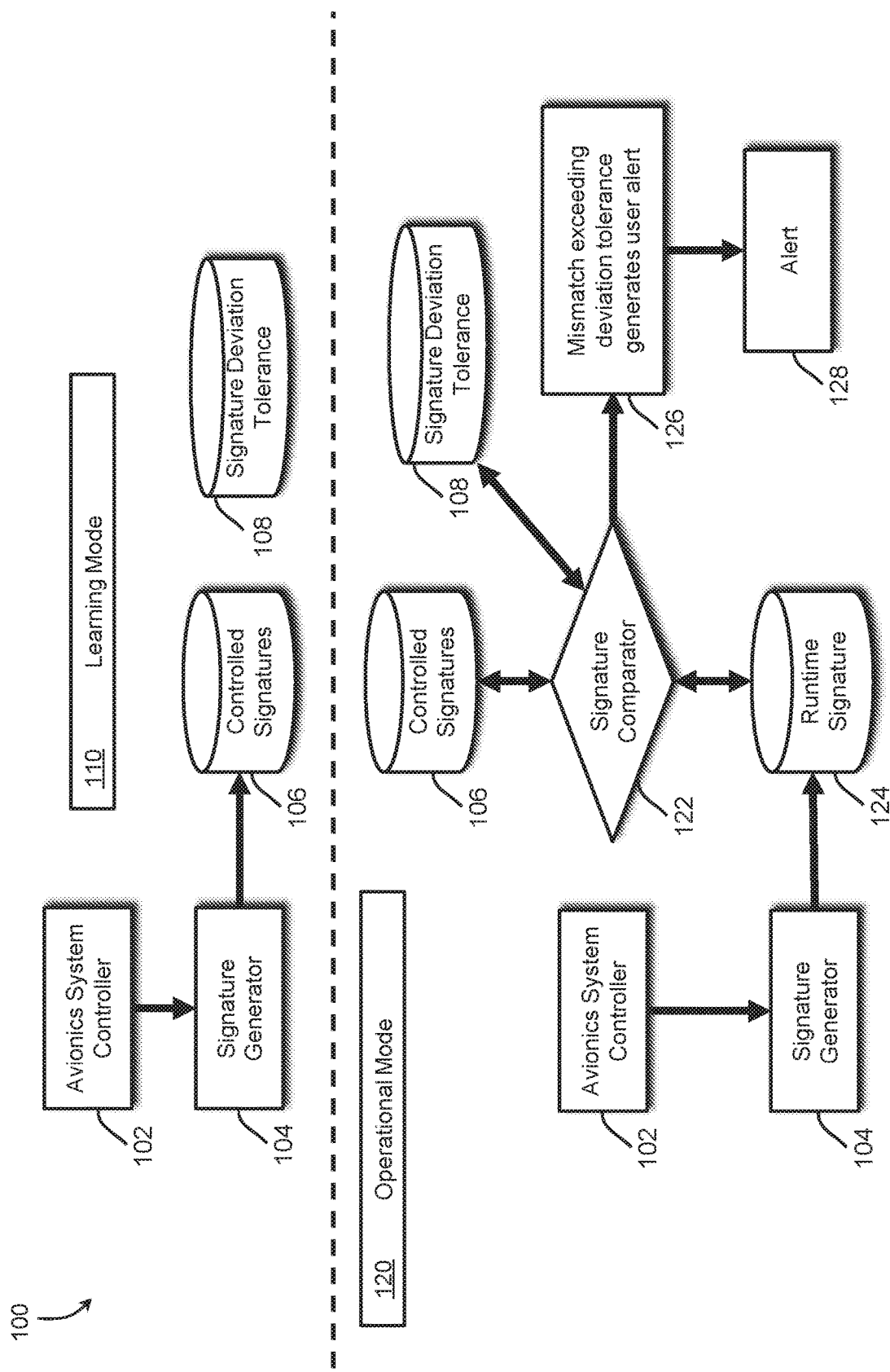
FIG. 1 is a diagram of a dual mode embedded threat detector in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a method for detecting a threat to an avionics system includes an Embedded Threat Detector (ETD) providing a non-bypassable module which compares run time signatures of each running application with pre-defined database of signatures. Any variation outside of pre-defined bounds implies an existence of malware. The ETD is located in a root Virtual Machine (VM0) and has two modes of operation. A learning mode in a controlled environment generates a database of controlled signatures for each software thread as the software is executed. Conversely, in the run mode during operations, the ETD generates signatures in real time and compares the real time signatures with the controlled signatures. A mismatch exceeding specified limits generates an alert and notifies a user.

| REFERENCE CHART | |
|---|---|
| 100 | Embedded Threat Detector |
| 200 | Avionics System |
| 300 | Logic Flow |
| 400 | Method Flow |
| 102 | Avionics System Controller |
| 104 | Signature Generator |
| 106 | Controlled Signatures |
| 108 | Signature Deviation Tolerance |
| 110 | Learning Mode |
| 120 | Operational Mode |
| 122 | Signature Comparator |
| 124 | Runtime Signature |
| 126 | Mismatch Determination |
| 128 | Alert |
| 302 | Store Signature Tolerance |
| 304 | Execute Avionics System Application |
| 306 | Generate Controlled Signatures |
| 308 | Store Controlled Signatures |
| 310 | Execute Avionics System Application |
| 312 | Generate Runtime Signature |
| 314 | Query Signature Match |
| 316 | Query Deviation Within Tolerance |
| 318 | Alert User |
| 402 | Associate ETD With Avionics System |
| 404 | Generate Controlled Signatures |
| 406 | Store Controlled Signatures |
| 408 | Generate Runtime Signatures |
| 410 | Compare Signatures |
| 412 | Determine A Difference |
| 414 | Compare Difference with Deviation Tolerance |
| 416 | Alert a User |

FIG. 1 ETD

Referring now to FIG. 1, a diagram of a dual mode embedded threat detector in accordance with an embodiment of the inventive concepts disclosed herein is shown. A dual mode Embedded Threat Detector (ETD) 100 may be associated with an avionics system controller 102 onboard an aircraft. In embodiments, the ETD 100 may be incorporated within a non-bypassable root virtual machine within the avionics system controller 102. The ETD 100 may include function within a learning mode 110 and an operational mode 120.

The avionics system controller 102 may be associated with each connectable system onboard the aircraft and function to control one or more embedded avionics applications onboard an aircraft.

While controlling the avionics systems, the avionics system controller 102 may generate a plurality of threads for each avionics application which may function on the avionics system controller 102. From these threads, a signature generator 104 may function to reduce each thread to a fixed length signature. In one embodiment, the fixed length signature may be a combination of characters of an exemplary 256 characters in length. The ETD 100 may store each signature generated by the signature generator 104 within a storage of controlled signatures 106.

As used herein, a signature may be defined as a fixed length string which is a unique signature for a potential variable length message (e.g., executable code). The signature may define the thread, and therefore the avionics application, to which the thread applies. For example, an avionics display may function based on one or more avionics applications operating on a mission computer onboard an aircraft. As each application operates, the controller may create threads to perform one or more functions within the display application. The signature generator 104 may reduce one or more threads within the display application to the fixed length string which may be more efficiently analyzed by the ETD 100.

A threat may be defined as any function or application operating on the avionics system controller 102 which may cause an undesirable result from a planned function. One threat may include malware code functioning on the avionics system controller 102 causing an undesirable result. Some threats may include a man in the middle threat where an invader may secretly relay and possibly alter a communication between two parties who believe they are directly communicating with each other. This invasion may release unsuspected information as well as cause the avionics system controller 102 to perform an undesirable function or operation. A zero-day threat may also cause undesirable function including threats for which no signature exists prior to the execution of the offending application.

A signature deviation tolerance 108 may be an allowable level of deviation between a runtime signature 124 and a controlled signature 106 as analyzed by the ETD 100. In function, the signature deviation tolerance 108 may be stored within the NVM coupled with the ETD 100 onboard the aircraft.

Contemplated herein, the ETD 100 may function to counter threats attempting to enter the avionics system controller 102 via, for example, a radio frequency (RF) connection transmitted by a station on the ground and received by a RF receiver onboard the aircraft. Each avionics system controller 102 may include one or more processors configured to carry out processes associated with successful operation of the aircraft.

Learning Mode

In function, the ETD 100 may function in the learning mode 110 to prepare for operation within the operational mode 120. The learning mode 110 may be defined as an environment free from threats to the function and operation of each application operating on the avionics system controller 102. Each application (e.g., the avionics display) may be operated in its entirety to ensure each application may complete its function. During this learning mode 110 function, the ETD 100 may employ the signature generator 104 to generate a plurality of controlled signatures associated with each application functional on the avionics system controller 102. The ETD may store each generated signature within the controlled signatures 106 for later use in the operational mode 120. In one embodiment, the controlled signatures 106 may be indexed by time tick and thread ID and linked to an Operational Flight Program (OFP) load file.

A user may cause the ETD 100 to enter the learning mode prior to an operational environment. For example, an environment void of threats may be found within a closed hangar of maintenance facility. A user may disconnect the avionics system controller 102 from all external connections where a threat may enter the avionics system controller 102. Once within the operational environment, the user may determine to refrain from enabling the learning mode since the absence of threats may not be guaranteed.

Operational Mode

The operational mode 120 may be defined as an environment where threats to the avionics system controller 102 may be present. The operational mode 120 may include a signature comparator 122, a storage of runtime signatures 124, a mismatch determination 126, and an alert 128.

In the operational mode 120, the avionics system controller 102 may function to operate each of many avionics applications associated with the operation of the aircraft. The signature generator 104 may similarly function to generate the signatures associated with each application thread. The signature comparator 122 may function to compare each fixed length runtime signature 124 with one or more of the fixed length signatures stored within the controlled signatures 106.

In one embodiment of the inventive concepts disclosed herein, the signature comparator 122 may include a string to string analysis of the signatures. In this manner, an exact match must be present to allow the operation to continue without an alert. In one embodiment of the inventive concepts disclosed herein, the signature comparator 122 may include a Principal Component Analysis (PCA) of the difference between the generated runtime signature 124 and one or more of the controlled signatures 106. Here, the PCA may enable a certain level of tolerance of the difference.

If the avionics system controller 102 remains unaffected by a threat, each runtime signature may match with a controlled signature 106 and the avionics system controller 102 may continue a healthy operation. However, during the operational mode 120, a corrupted runtime signature 124 may be dissimilar from a controlled signature 106, causing a mismatch determination 126.

Without the signature deviation tolerance 108, each mismatch determination 126 may generate an alert 128 which may eventually become an annoyance to the user. An alert 128 may include guidance offered to the user to enable safe continued operation of the avionics application. The ETD 100 may advise the user to take one or more actions including disabling the avionics application associated with the thread causing an audible and visual alert, a quarantine of the application, a system restart, or a system shutdown.

Limit False Positive Results

In one embodiment of the inventive concepts disclosed herein, the signature deviation tolerance 108 may be based on a user defined level of allowable risk and may be changeable during the learning mode by the user.

In one embodiment of the inventive concepts disclosed herein, the signature deviation tolerance 108 the ETD 100 may function to limit a number of false positive results generated as a result of a runtime signature 124 which may not be an exact match to a signature found in the controlled signatures 106. In one embodiment of the inventive concepts disclosed herein, the signature deviation tolerance 108 may be fixed within the NVM during the learning mode. In another embodiment, the signature deviation tolerance 108 may be changeable by the user during the operational mode 120. For example, should a user in the operational mode 120 be inundated with alerts, the user may increase or decrease the signature deviation tolerance 108 to suit the mission.

The signature deviation tolerance 108 may account for a slight variation between the controlled signatures 106 and the runtime signature 124. The ETD 100 may employ a mathematical model to compensate for the variation in execution paths not accounted for in the signature generation in the learning mode 110.

Figure 2:
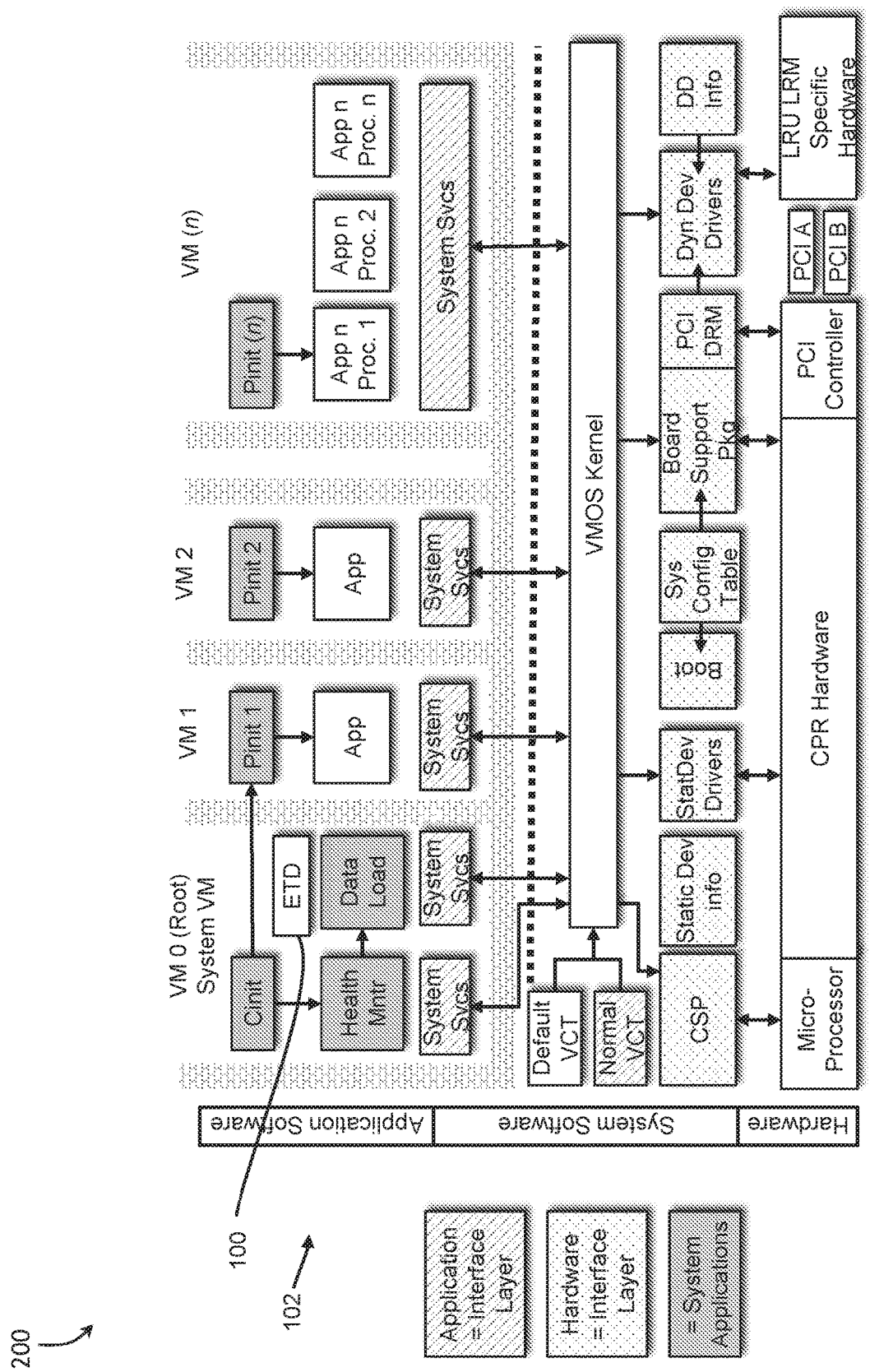
FIG. 2 is a diagram of an exemplary virtual location of an embedded threat detector in accordance with an embodiment of the inventive concepts disclosed herein.

FIG. 2 Avionics System

Referring now to FIG. 2, a diagram of an exemplary virtual location of the ETD 100 in accordance with an embodiment of the inventive concepts disclosed herein is shown. Generally, the ETD 100 may be sited within a location which is Non-bypassable, Evaluatable, Always implemented, Tamper protected (NEAT). In this manner, the NEAT location may include a Virtual Machine zero (VM) 0 root system VM where the ETD 100 operates in parallel with the most basic operation of the avionics system controller 102 begins function before all additional virtual machines and applications within the avionics system controller 102.

Contemplated herein, the ETD 100 may function with a limited scope within the avionics system controller 102 and, although may function, is not specifically designed for a desktop type computer. This limited scope may enable the ETD 100 to operate without adding runtime to one or more of the VMs operating on the avionics system controller 102.

In one embodiment of the inventive concepts disclosed herein, the ETD 100 may be incorporated within a Bare Metal Hypervisor (BMH) in a location independent of the Operating System (OS) in which the ETD 100 is associated. In this location, the ETD 100 may take advantage of OS abilities and maintains each OS privilege as opposed to an application VM which may not.

FIG. 3 Logic Flow

Figure 3:
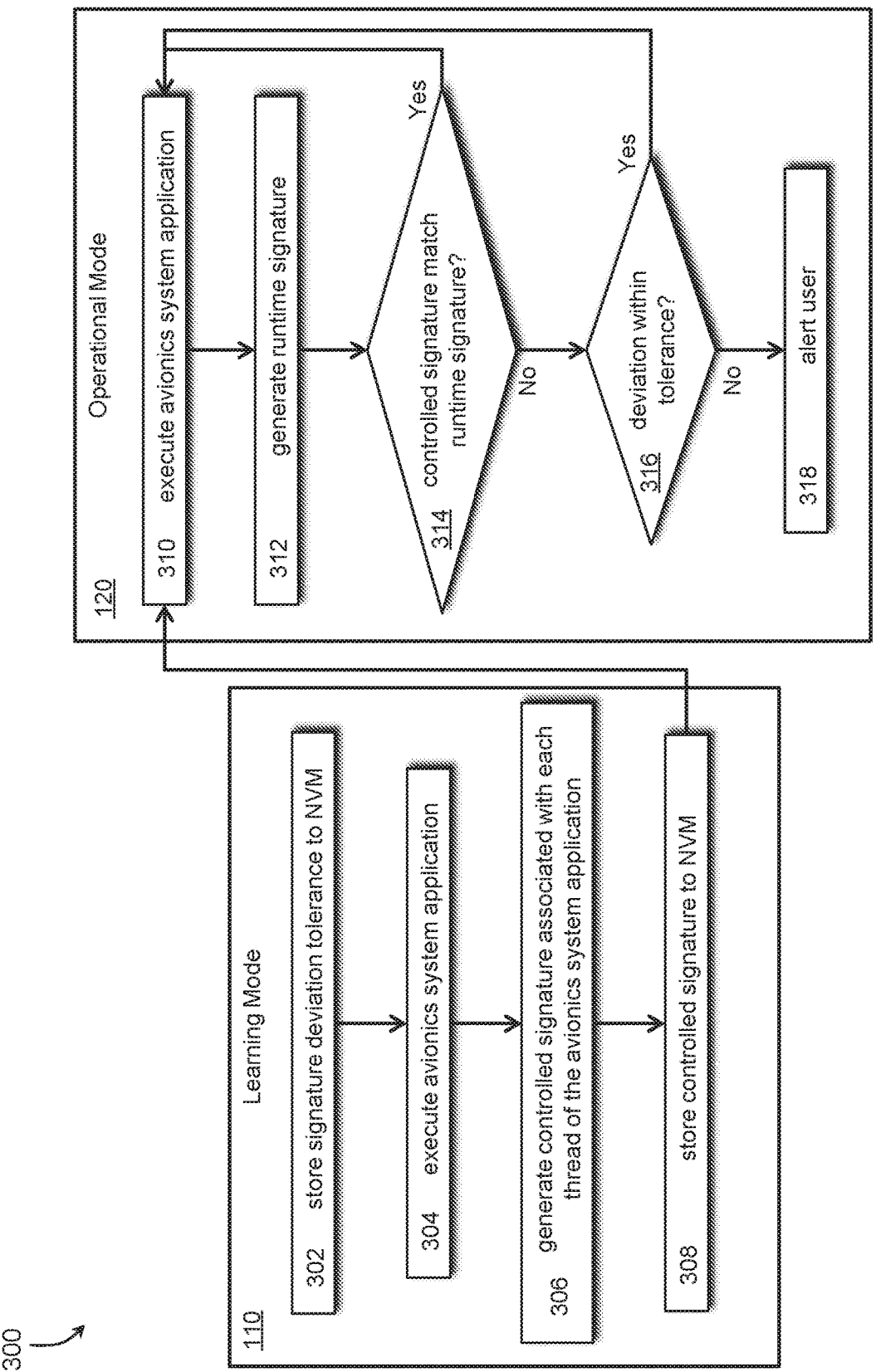
FIG. 3 is a diagram of a method flowchart exemplary of an embodiment of the inventive concepts disclosed herein.

Referring now to FIG. 3, a diagram of a method flowchart exemplary of an embodiment of the inventive concepts disclosed herein is shown. In the learning mode 110 of the ETD 100, a step 302 may include storing the signature deviation tolerance to the NVM. The ETD may, at a step 304, execute avionics system applications to generate, at a step 306, a plurality of controlled signatures, each controlled signature of the plurality of controlled signatures defining at least one controlled thread of an avionics application associated with the avionics system application. The ETD may, at a step 308, store the generated controlled signatures to the NVM.

In the operational mode 120, the ETD 100 may at a step 310, execute one or more avionics system applications and generate, at a step 312, runtime signatures associated with and representative of a thread generated by the avionics system application. A query at a step 314 may compare and determine if the generated runtime signature may match one or more of the stored controlled signatures. Should the result of query 314 be positive, the logic may flow back to the step 310 to continue executing avionics system applications. Should the result of query 314 be negative, the logic may pass to an additional query at a step 316 determining if the deviation is within the signature deviation tolerance. Again, should the result of query 316 be positive, the logic may pass back to the step 310. If negative the logic may pass to a step 318 to generate an alert to the user.

In one embodiment of the inventive concepts disclosed herein, the ETD 100 may function periodically to limit the resources used. In one embodiment, the ETD 100 may function at an exemplary 100 ms interval to capture one of more of the runtime signatures 124 and compare with the controlled signature 106.

FIG. 4 Method Flow

Figure 4:
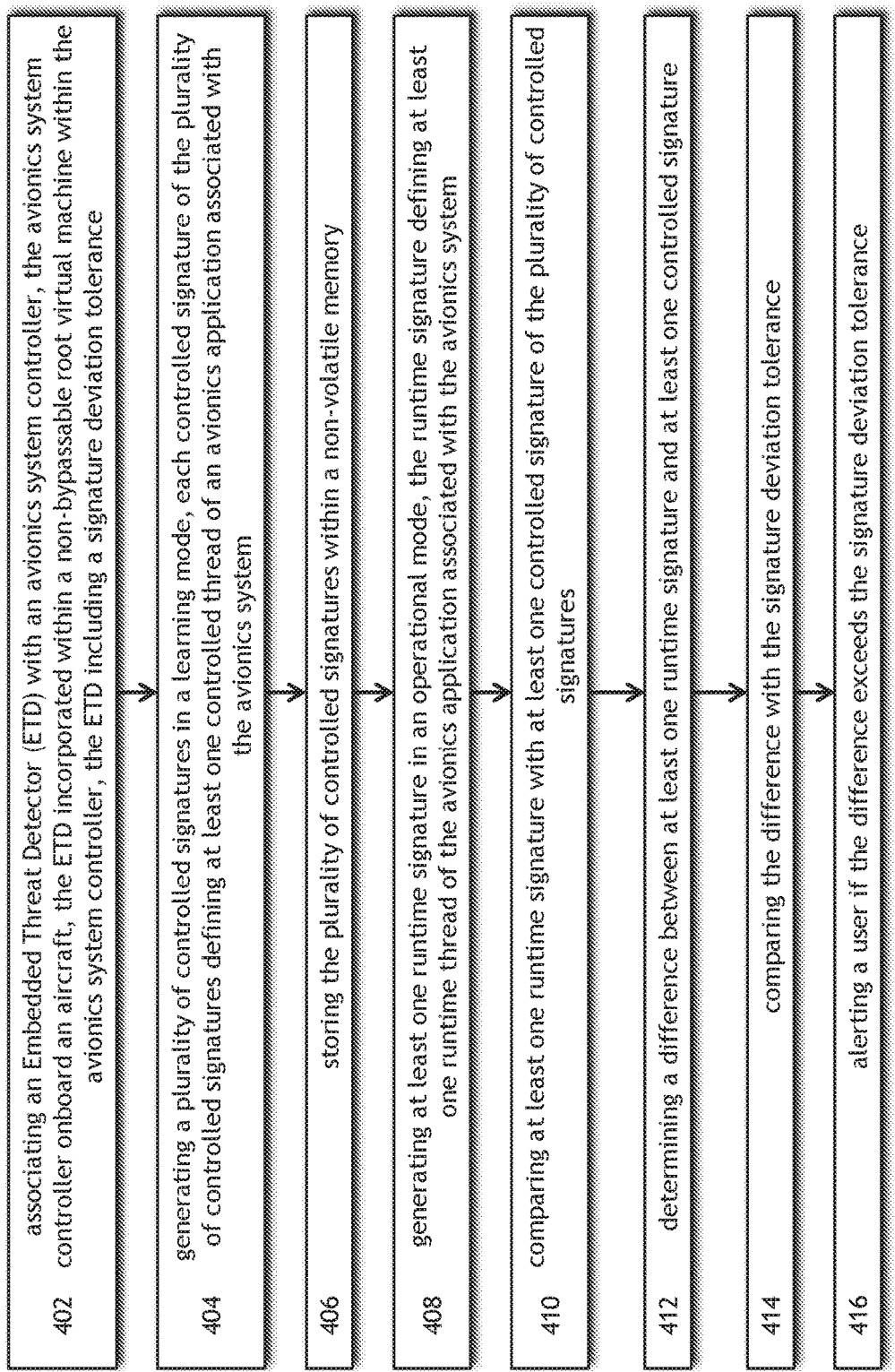
FIG. 4 is a diagram of a method flow exemplary of one embodiment of the inventive concepts disclosed herein.

Referring now to FIG. 4, a diagram of a method flow exemplary of one embodiment of the inventive concepts disclosed herein is shown. A method for detecting a threat to an avionics system may include, at a step 402, associating an Embedded Threat Detector (ETD) with an avionics system controller, the avionics system controller onboard an aircraft, the ETD incorporated within a non-bypassable root virtual machine within the avionics system controller, the ETD including a signature deviation tolerance.

The method may include, at a step 404, generating a plurality of controlled signatures in a learning mode, each controlled signature of the plurality of controlled signatures defining at least one controlled thread of an avionics application associated with the avionics system and the method may include, at a step 406, storing the plurality of controlled signatures within a non-volatile memory.

The method may include, at a step 408, generating at least one runtime signature in an operational mode, the runtime signature defining at least one runtime thread of the avionics application associated with the avionics system and, at a step 410, comparing at least one runtime signature with at least one controlled signature of the plurality of controlled signatures.

The method may include, at a step 412, determining a difference between at least one runtime signature and at least one controlled signature and, at a step 414, comparing the difference with the signature deviation tolerance. The method may include, at a step 416, alerting a user if the difference exceeds the signature deviation tolerance.

CONCLUSION

As will be appreciated from the above description, embodiments of the inventive concepts disclosed herein may provide a novel solution to avionics threat detection and mitigation by providing an embedded threat detector capable of protecting avionics systems against unknown threats.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A method for detecting a threat to an avionics system, comprising:

associating an Embedded Threat Detector (ETD) with an avionics system controller, the avionics system controller onboard an aircraft, the ETD incorporated within a non-bypassable root virtual machine within the avionics system controller, the ETD including a signature deviation tolerance;

generating a plurality of controlled signatures in a learning mode, each controlled signature of the plurality of controlled signatures defining at least one controlled thread of an avionics application associated with the avionics system;

storing the plurality of controlled signatures within a non-volatile memory;

generating at least one runtime signature in an operational mode, the at least one runtime signature defining at least one runtime thread of the avionics application associated with the avionics system;

comparing the at least one runtime signature with at least one controlled signature of the plurality of controlled signatures;

determining a difference between the at least one runtime signature and the at least one controlled signature;

comparing the difference with the signature deviation tolerance; and alerting a user if the difference exceeds the signature deviation tolerance.

2. The method for detecting a threat to an avionics system of claim 1, wherein the avionics system controller further comprises a system controller associated with each connectable system onboard the aircraft.

3. The method for detecting a threat to an avionics system of claim 1, wherein the ETD is further configured to counter a zero-day threat and a man in the middle attack.

4. The method for detecting a threat to an avionics system of claim 1, wherein the non-bypassable root virtual machine within the avionics system controller further comprises a location which begins functioning before any additional virtual machines and application.

5. The method for detecting a threat to an avionics system of claim 1, further includes changing the signature deviation tolerance based on a user defined level of allowable risk.

6. The method for detecting a threat to an avionics system of claim 5, wherein the user defined level of allowable risk is changeable during the learning mode by the user.

7. The method for detecting a threat to an avionics system of claim 1, wherein the learning mode further comprises a controlled environment free from a potential threat.

8. The method for detecting a threat to an avionics system of claim 1, wherein the operational mode further comprises an environment including a presence of potential threats.

9. The method for detecting a threat to an avionics system of claim 1, wherein comparing the difference with the signature deviation tolerance further comprises a principal component analysis of the difference.

10. The method for detecting a threat to an avionics system of claim 1, wherein alerting the user further comprises one of: an audible and visual alert, and includes a guidance to perform at least one of: a quarantine of an application associated with the at least one runtime signature causing the alert, a system restart, and a system shutdown.

11. A method for avionics system threat detection, comprising:

associating an Embedded Threat Detector (ETD) with an avionics system controller, the avionics system controller onboard an aircraft, the ETD incorporated within a non-bypassable root virtual machine within the avionics system controller, the ETD including a signature deviation tolerance;

generating a plurality of controlled signatures in a controlled environment;

storing the controlled signatures;

receiving and storing a signature deviation tolerance;

generating at least one runtime signature in an aircraft operational environment;

comparing the at least one runtime signature with at least one stored controlled signature of the plurality of controlled signatures;

determining a difference between the at least one runtime signature and at least one stored controlled signature of the stored controlled signatures;

comparing the difference with the signature deviation tolerance; and alerting a user if the comparing results in a difference that is outside the signature deviation tolerance.

12. The method for avionics system threat detection of claim 11, wherein comparing the difference with the signature deviation tolerance further comprises storing a result of the comparing which results the difference outside the deviation tolerance.

13. The method for avionics system threat detection of claim 11, wherein the aircraft operational environment further comprises at least one processor onboard an aircraft.

14. The method for avionics system threat detection of claim 11, further comprising communicating an instance of the difference that is outside the signature deviation tolerance offboard the aircraft.

15. The method for avionics system threat detection of claim 11, further comprising receiving a user change to the signature deviation tolerance.

* * * * *